(12) United States Patent
Eichinger et al.

(10) Patent No.: US 12,240,311 B2
(45) Date of Patent: Mar. 4, 2025

(54) MOTOR VEHICLE BATTERY FOR A MOTOR VEHICLE AND ITS USE IN A MOTOR VEHICLE

(71) Applicant: Mahle International GmbH, Stuttgart (DE)

(72) Inventors: Thomas Eichinger, Berglen (DE); Tilman Kaiser, Leinfelden-Echterdingen (DE); Georg Votteler, Backnang (DE)

(73) Assignee: Mahle International GmbH (DE)

( * ) Notice: Subject to any disclaimer, the term of this patent is extended or adjusted under 35 U.S.C. 154(b) by 304 days.

(21) Appl. No.: 17/752,854

(22) Filed: May 25, 2022

(65) Prior Publication Data
US 2022/0379708 A1    Dec. 1, 2022

(30) Foreign Application Priority Data
May 25, 2021 (DE) .......................... 102021205302.5

(51) Int. Cl.
*B60K 1/04*    (2019.01)
*H01M 50/238*    (2021.01)
*H01M 50/242*    (2021.01)

(52) U.S. Cl.
CPC ............. *B60K 1/04* (2013.01); *H01M 50/238* (2021.01); *H01M 50/242* (2021.01); *H01M 2220/20* (2013.01)

(58) Field of Classification Search
CPC .... B60K 1/04; H01M 50/242; H01M 50/238; H01M 2220/20

USPC ........................................................ 180/68.5
See application file for complete search history.

(56) References Cited

U.S. PATENT DOCUMENTS

| | | | | |
|---|---|---|---|---|
| 6,386,611 | B1 * | 5/2002 | Buchfink | B60R 11/02 |
| | | | | 296/37.16 |
| 7,568,755 | B2 * | 8/2009 | Imada | B62D 21/152 |
| | | | | 296/187.11 |
| 9,561,823 | B2 * | 2/2017 | Eberle | B60K 1/04 |
| 9,590,216 | B2 * | 3/2017 | Maguire | H01M 50/262 |
| 9,981,541 | B2 * | 5/2018 | Onodera | B60K 1/04 |
| 10,005,350 | B1 * | 6/2018 | Khan | B60K 1/04 |
| 10,259,304 | B2 | 4/2019 | Brausse et al. | |

(Continued)

FOREIGN PATENT DOCUMENTS

| | | |
|---|---|---|
| CN | 108137081 A | 6/2018 |
| CN | 109421506 A | 3/2019 |

(Continued)

OTHER PUBLICATIONS

Chinese Office Action dated Jan. 15, 2024 and Chinese Search Report dated Jan. 12, 2024 for Chinese Patent Application No. 2022105709432.

(Continued)

*Primary Examiner* — Hau V Phan
(74) *Attorney, Agent, or Firm* — Fishman Stewart PLLC (57) ABSTRACT

A motor vehicle battery for a motor vehicle is disclosed. The motor vehicle battery includes a one-piece holder including a plurality of holding portions connected to one another via a bending portion of the holder. The bending portion upon a force introduction at the plurality of holding portions permits a bending of at least one of the plurality of holding portions about a bending axis of the bending portion.

20 Claims, 4 Drawing Sheets

(56) References Cited

U.S. PATENT DOCUMENTS

| | | | |
|---|---|---|---|
| 10,293,697 B2* | 5/2019 | Goitsuka | B60L 50/66 |
| 10,377,218 B1* | 8/2019 | Pachore | B62D 25/08 |
| 10,597,066 B2* | 3/2020 | Kurz | F16F 7/128 |
| 10,632,857 B2* | 4/2020 | Matecki | B60L 50/64 |
| 10,720,620 B1* | 7/2020 | Grace | H01M 50/244 |
| 10,800,244 B2* | 10/2020 | Sawatzki | B60K 1/04 |
| 2018/0272869 A1* | 9/2018 | Sekine | B60L 3/003 |
| 2018/0337377 A1* | 11/2018 | Stephens | H01M 50/224 |
| 2019/0214615 A1* | 7/2019 | Hilmann | B60L 3/0007 |
| 2020/0180443 A1* | 6/2020 | Frost | B23K 9/025 |
| 2022/0281305 A1 | 9/2022 | Amsz | |

FOREIGN PATENT DOCUMENTS

| | | |
|---|---|---|
| DE | 102015008488 A1 | 1/2016 |
| DE | 10 2016 110 787 A1 | 12/2017 |
| JP | 2015-43 336 A | 3/2015 |
| JP | 2015043336 A | 3/2015 |
| JP | 2016-97 783 A | 5/2016 |
| JP | 2016097783 A | 5/2016 |
| JP | 2019-65 892 A | 4/2019 |
| JP | 2019065892 A | 4/2019 |
| WO | 2020182594 A1 | 9/2020 |
| WO | 2021043983 A1 | 3/2021 |

OTHER PUBLICATIONS

English abstract for JP-2015-43 336.
English abstract for JP-2016-97 783.
English abstract for JP-2019-65 892.
German Search Report for DE-102021205302.5, dated Feb. 17, 2022.

* cited by examiner

Fig. 1
(Prio art)

Fig. 2
(Prio art)

MOTOR VEHICLE BATTERY FOR A MOTOR VEHICLE AND ITS USE IN A MOTOR VEHICLE

CROSS-REFERENCE TO RELATED APPLICATION

This application claims priority to German Application No. DE 10 2021 205 302.5 filed on May 25, 2021, the contents of which are hereby incorporated by reference in its entirety.

TECHNICAL FIELD

The invention relates to a motor vehicle battery for a motor vehicle and to a use of such a motor vehicle battery in a motor vehicle.

BACKGROUND

Design solutions for motor vehicle batteries for motor vehicles are known. With these it can be achieved that corresponding motor vehicle batteries can be fixed on a motor vehicle in a relatively safe and secure manner. Disadvantageous in these design solutions however is that they cannot adequately satisfy rising demands on the accident safety of a motor vehicle battery which in the following is to be understood as synonym for the behaviour of a motor vehicle battery in an accident. In particular, it cannot be reliably prevented with the known design solutions that a disruptive body, which during a corresponding accident exerts a mechanical force introduction on a motor vehicle battery and enters the motor vehicle battery until a certain counterforce is reached, mechanically overloads motor vehicle battery attachment parts and/or drives these motor vehicle battery attachment parts into a housing of the motor vehicle battery, i.e. that these penetrate the housing and, in the event, damage safety-relevant internal components of the motor vehicle battery.

The object of the invention lies in stating an improved or at least another embodiment of a motor vehicle battery compared with this.

In the present invention, this object is solved in particular through the subjects of the independent claim(s). Advantageous embodiments are subject of the dependent claims and the description.

SUMMARY

The basic idea of the invention lies in equipping motor vehicle battery attachment parts, which here are realised by holders, with a bending portion so that these upon a force introduction in particular by a disruptive body, can perform an evasive movement in the form of a bending.

To this end it is provided that a motor vehicle battery for a motor vehicle is equipped with an in particular separate, one-piece holder which comprises holding portions that are connected to one another via a bending portion of the holder. Upon a force introduction, the bending portion realises at the holding portions a bending of at least one holding portion about a bending axis of the bending portion. By way of this it is advantageously possible that at least one force-loaded holding portion can evade the force introduction, which is practically assigned a force direction, transversely with respect to the force introduction, which practically takes place subject to plastic deformation of the bending portion and further practically within the scope of a relative movement of the force-loaded holding portion about the said bending axis relative to at least one other holding portion. By way of this, a holding portion can escape a direct force loading by the force introduction so that in particular a penetration of a housing of the motor vehicle battery by a force-loaded holding portion can be reliably prevented, which is advantageous for example for the mentioned accident safety of the motor vehicle battery according to the invention. Furthermore, a weakening of the force introduction can also be achieved through the bending of at least one holding portion, for example as with an energy-absorbing accident structure.

It is practical when the bending portion is formed so as to be ductile. By way of this it is achieved that a holding portion of the holder can be bent round about the bending axis of the bending portion when on the holder or on its holding portions a corresponding force introduction takes place without the bending portion failing by way of a brittle fracture, which could lead to a termination of the bending. Here, ductile material properties of the bending portion can be an advantage, i.e. that the material of the bending portion has a flowability up to a certain degree. Likewise, the bending portion could be configured spring-elastically which, following the withdrawal of a force introduction from the respective holding portion, could lead to a certain resetting effect.

Furthermore it can be practical when the bending portion and the holding portions are formed material-identically. This means that the bending portion and the holding portions are produced from the same material. Here, the bending portion and the holding portions form an integral unit which can be referred to as one-piece holder. At least in principle it is conceivable that the bending portion and the holding portions are each produced from different materials and are joined so that they form an integral unit, which can be referred to as one-piece holder.

The holder or the bending portion and/or the holding portions can in principle be produced from any material but particularly suitable is a metal material, a plastic material or a composite material.

In this connection it is also conceivable that the holder, in particular its bending portion and its holding portions, are practically produced from a monolithic material. This means that this holder can consist of a contiguous, seamless piece, which defines an integral unit that can be referred to as one-piece holder.

The motor vehicle battery can further be characterised in that exactly two holding portions are provided which are connected via a bending portion, in particular in a ductile manner. Here, a first holding portion of these two holding portions can be fixed on a housing of the motor vehicle battery while a second holding portion of these two holding portions is fixed or can be fixed on a motor vehicle structural part of the motor vehicle and/or is fixed or can be fixed on a motor vehicle peripheral part of the motor vehicle. A motor vehicle structural part of the motor vehicle can be a structure-imparting component of the motor vehicle, in particular a cross-member or side-member. A motor vehicle peripheral part by contrast can be formed by a component of the motor vehicle not imparting a structure, in particular an electrical line or other components of the motor vehicle not imparting structure. It is obvious that the motor vehicle battery can be equipped with more than one, for example four or more holders, as a result of which the motor vehicle battery can be connected to the motor vehicle relatively safely and securely.

It is practical when the first holding portion, with respect to the second holding portion, is oriented orthogonally. This means that between the two holding portions an angle of 90° is defined. Other angles are at least practically conceivable, for example angles in a tolerance range of +/−5° about the described orthogonal orientation. Because of this, the motor vehicle battery can be relatively easily and briskly connected to a motor vehicle structural part of the motor vehicle.

It is practical, further, when the bending portion of the holder merges with a radius or in the form of an ellipse or in the form of an involute from the first holding portion into the second holding portion. Because of this, a quasi-steady, non-sudden transition from the one to the other holding portion is realised. In other words this can mean that the bending portion in a cross-sectional plane has a flowing contour in the profile, in particular so that the contour or the contour lines of the bending portion describe a radius, an ellipse or an involute. Because of this, the bending of at least one holding portion, in particular in a predetermined direction, can be relatively easily realised.

Further it can be provided that the first holding portion comprises or forms a fixing portion which defines a flat equipping surface, wherein the first holding portion is fixed on the housing via the equipping surface of the fixing portion directly or indirectly supported over the full surface area on a side shell surface of the housing of the motor vehicle battery oriented orthogonally with respect to a travelling direction of the motor vehicle. The fixing can be permanent or releasable. The fixing of the first holding portion on the housing can, further, be realised by way of a screw connection and/or a weld and/or a bond. Between the equipping surface of the holder and the side shell surface of the housing, an intermediate layer can be arranged, which can practically be a vibration decoupling element or similar. Because of this, the holder can be advantageously fixed on the housing of the motor vehicle battery relatively cost-effectively and with simple production means.

It is practical, further, when the second holding portion comprises or forms a further fixing portion, which comprises a fixing means and defines a flat further equipping surface, wherein the second holding portion can be arranged on the motor vehicle structural part with the help of the fixing means via the further equipping surface supported over the full surface area directly or indirectly on a mounting surface of the motor vehicle structural part of the motor vehicle. Here, too, the fixing can be of the permanent or again releasable type. The fixing means can be realised by way of a fixing means recess, in particular a screw hole for a fastening screw, through which a fixing means arranged on the holding portion and on the motor vehicle part, in particular a fastening screw, can engage in order to thereby fix or at least render fixable the second holding portion on the motor vehicle component. Between the further equipping surface of the holder and the mounting surface of the motor vehicle part a further intermediate layer can be arranged, wherein this can practically be a vibration decoupling element or similar. The fixing means can also be realised for example by a threaded pin or similar.

Further practically, the second holding portion can comprise a chamfer or bevel or flattened portion at a free front portion that is distant from the bending portion facing away from the housing of the motor vehicle battery. Practically, the first holding portion can also comprise such a chamfer or bevel or flattened portion. Further practically, this chamfer is a sliding surface and configured angularly tilted, for example, tilted by up to 1° to smaller than 90° with respect to the force introduction or the force direction of the force introduction and/or with respect to a main extension direction of the second holding portion. Because of this, upon a force introduction on the second holding portion caused by a disruptive body, the second holding portion can always slide off via the sliding surface or the chamfer on the disruptive body in a predetermined direction and realise a desired bending about the bending portion. The chamfer or the sliding surface can also be realised for example by a wall thickness of the second holding portion decreasing in the direction away from the housing of the motor vehicle battery or in the direction of the main extension direction of the second holding portion. Because of this, the second holding portion practically has, on its free front portion, a thinner wall thickness than at its root in the region of the bending portion. Because of this, the bending about the bending portion can be ensured or at least favoured.

The motor vehicle battery or a method for folding down a holding portion of a holder of a motor vehicle battery can be further characterised in that the two holding portions of the holder connected via a bending portion are transferred out of a starting state, in which the two holding portions are oriented orthogonally to one another or at least angularly to one another, in particular as described above into a bent-over state by way of bending round about the bending axis, in which they lie in a common plane and/or each touchingly support one another on the housing of the motor vehicle battery, in particular without a gap and/or over the full surface area. Practically, the said planes and a side shell surface of the housing of the motor vehicle battery coincide or are at least oriented parallel to one another. Because of this, a penetration of the housing of the motor vehicle battery by a force-loaded holding portion can be prevented.

The object mentioned above is additionally solved by using a motor vehicle battery according to the preceding description in a motor vehicle, in particular in an electrically driven motor vehicle, wherein the motor vehicle battery has at least one holder according to the preceding description and is installed in the motor vehicle and employed for feeding electrical consumers located there.

In summary it remains to note: the present invention preferentially relates to a motor vehicle battery for a motor vehicle having a one-piece holder, which comprises holding portions connected to one another via a bending portion of the holder, wherein the bending portion, upon a force introduction, makes possible on the holding portions a bending of at least one holding portion about a bending axis of the bending portion. Furthermore, the invention practically relates to the use of a motor vehicle battery in a motor vehicle, in particular in an electrically driven motor vehicle, wherein the motor vehicle battery comprises at least one such holder.

Further important features and advantages of the invention are obtained from the subclaims, from the drawings and from the associated figure description by way of the drawings.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
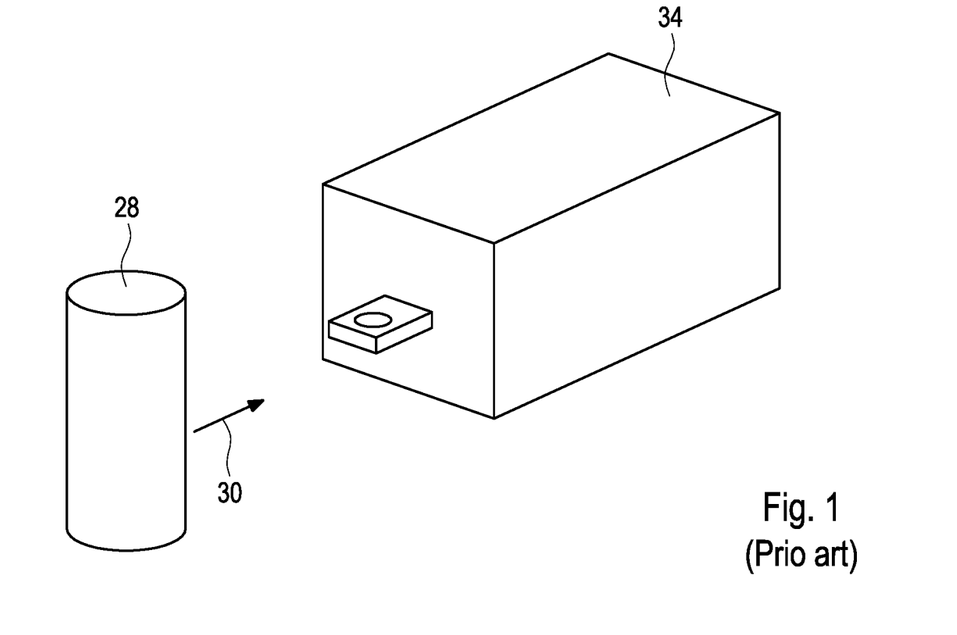
FIGS. 1 and 2 in two perspective views an accident situation between a motor vehicle battery according to the prior art and a disruptive body, which upon impact on this motor vehicle battery exerts a mechanical force introduction on the motor vehicle battery and its motor vehicle battery attachment parts and enters the motor vehicle battery pending the reaching of a certain counterforce, wherein a motor vehicle battery attachment part is mechanically overloaded and driven into a housing of this motor vehicle battery, FIGS. 3 and 4 in two perspective views an accident situation between a motor vehicle battery according to the invention and a disruptive body, which upon impact on this motor vehicle battery exerts a mechanical force introduction on the motor vehicle battery and its motor vehicle battery attachments parts and enters the motor vehicle battery pending the reaching of a certain counterforce, wherein a motor vehicle battery attachment part realised as holder according to the invention arranged on this motor vehicle battery is bent over in a bending portion by approximately 90° and laid flush into a plane oriented parallel with respect to a side shell surface of the housing of the motor vehicle battery so that the holder supports itself on the housing, as a result of which a mechanical overloading and a penetration of the housing is prevented, wherein the holder in FIG. 3 is indicated in a starting state and a bent-over state indicated in dotted line and in FIG. 4 merely in the bent-over state, FIG. 5 in a lateral view an alternative embodiment of a motor vehicle battery according to the invention, wherein the holder there comprises a chamfer and is indicated both in a starting state and in a bent-over state indicated by dotted line, FIG. 6 in a lateral view an alternative further embodiment of a motor vehicle battery according to the invention, wherein the holder there comprises a chamfer which is realised through a decreasing wall thickness of a second holding portion of the holder, and wherein the holder there is indicated in a starting state and a bent-over state indicated by dotted line, FIG. 7 in a lateral view, an alternative further embodiment of a motor vehicle battery according to the invention, wherein the holder there is indicated in a starting state and a bent-over state indicated by dotted line and finally in FIG. 8 in a lateral view the embodiment according to FIG. 7, however with the distinction that a bending portion of the holder there is shown with a radius or in the form of an ellipse, which in FIG. 7 is shown in an extract framed by dotted line, or is shown in the form of an involute, which is shown in FIG. 7 by a further extract framed by a dotted line, merges from a first holding portion into a second holding portion.
Figure 2:
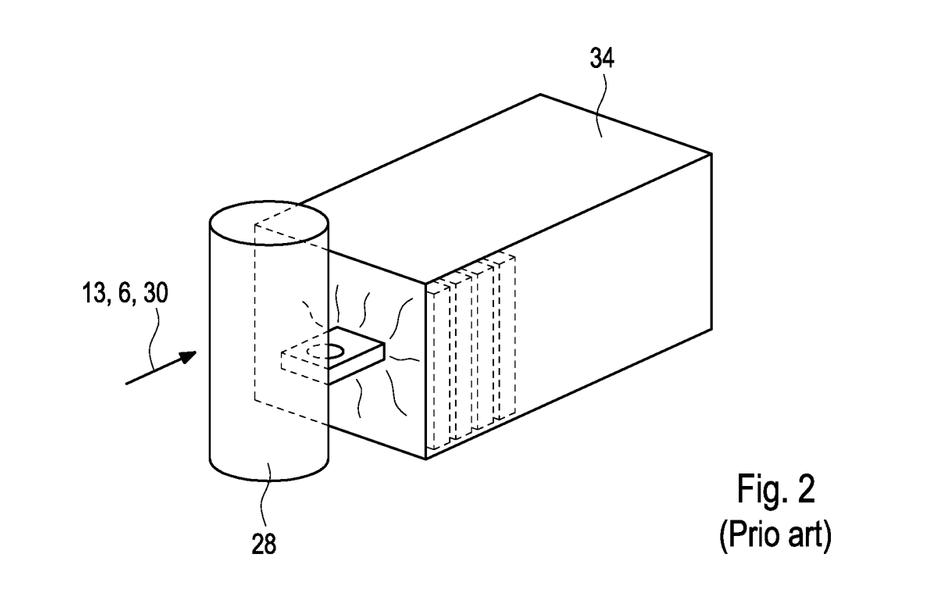

FIGS. 1 and 2 jointly illustrate, each in a perspective view, an accident situation which can also represent a test situation, between on the one hand a motor vehicle battery 34 according to the prior art and on the other hand a disruptive body 28, which can represent any accident opponent or test body, which upon impact on this motor vehicle battery 34 in a direction referred to as disruptive body movement direction 30, exerts a mechanical force introduction 6 on the motor vehicle battery 34 and its motor vehicle battery attachment parts in a direction referred to as force direction 13, see FIG. 2. In the process, the disruptive body 28 pending the reaching of a certain counterforce enters the motor vehicle battery 34, see FIG. 2, wherein a motor vehicle battery attachment part arranged on this motor vehicle battery 34 is mechanically overloaded and driven into a housing of this motor vehicle battery 34. Thus, this housing is penetrated so that possible safety-relevant internal components of the motor vehicle battery 34 are damaged, which is undesirable.

FIGS. 3 to 8 illustrate different exemplary embodiments of a motor vehicle battery according to the invention as a whole marked with the reference number 1 for a motor vehicle 15 merely indicated in a greatly simplified manner which can be moved on a surface 31 in a travelling direction 16 indicated by means of an arrow. The motor vehicle battery 1 can be used in such a motor vehicle 15, which can be for example an electrically driven motor vehicle, in order to feed either electrical consumers of the motor vehicle 15 and/or an electric drive of the motor vehicle 15 with electric energy. For this purpose, the motor vehicle battery 1 for example is releasably fixed via holders 2 on motor vehicle structural parts 17 of the motor vehicle 15.

Figure 3:
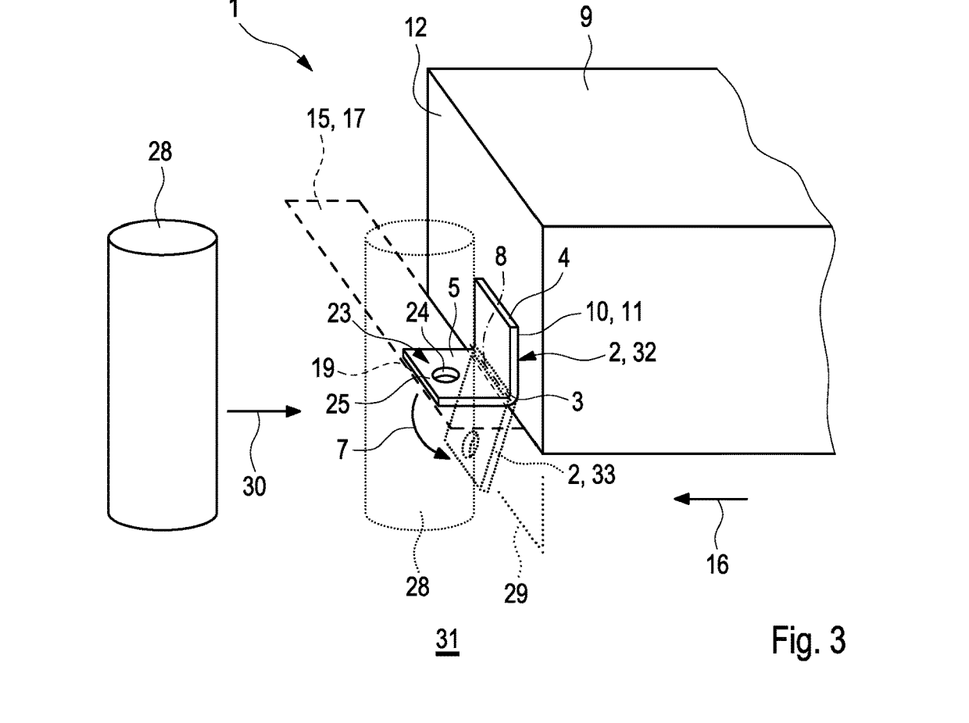
Figure 4:
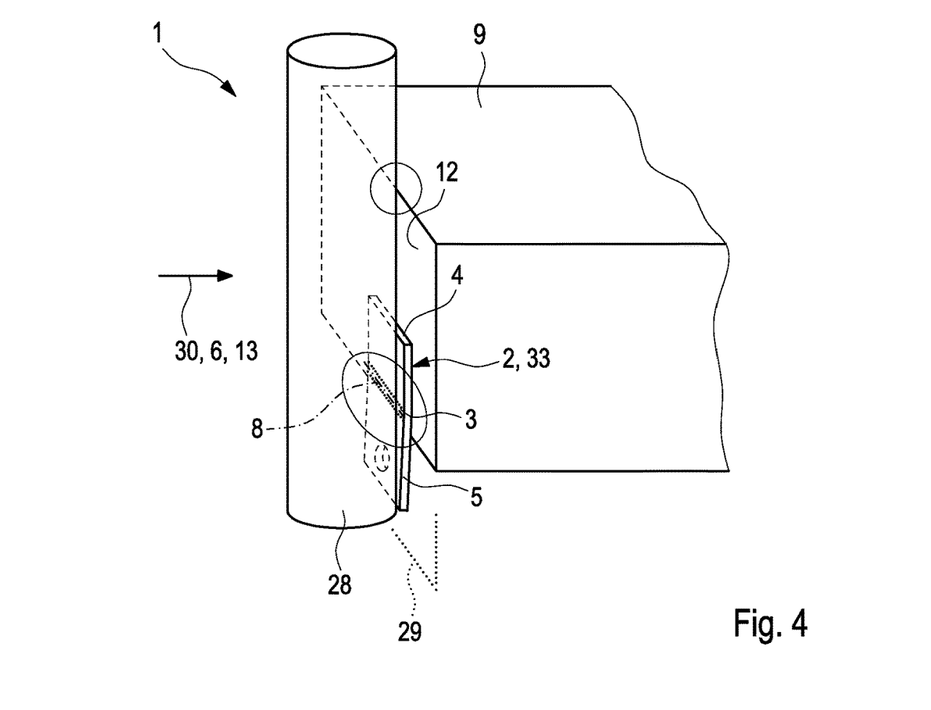

With reference to FIGS. 3 and 4, it is possible to recognise in two perspective views an accident situation that is comparable with the accident situation illustrated in FIGS. 1 and 2, wherein however a disruptive body 28 now strikes a motor vehicle battery 1 according to the invention in a disruptive body movement direction 30, see in particular FIG. 3. When the disruptive body 28 impacts the motor vehicle battery 1, a mechanical force introduction 6 is exemplarily brought about on the motor vehicle battery 1 and its motor vehicle battery attachment parts, which are exemplarily realised by a single holder 2, see FIG. 4. Here, the disruptive body 28 enters the motor vehicle battery 1 until a certain counterforce is reached. The said holder 2, which is initially in a starting state 32, which in FIG. 3 is indicated with continuous lines of the holder 2, is bent over by the said force introduction 6 at a bending portion 3 of the holder 2 and placed flush into a plane 29 oriented parallel with respect to a flat side shell surface 12 of a housing 9 of the motor vehicle battery 1, which in FIGS. 3 and 4 is merely indicated in the form of an extract with dotted lines, so that the holder 2 can support itself flat on the housing 9 of the motor vehicle 1, which is referred to as bent-over state 33 and in FIGS. 3 and 4 indicated in each case with dotted lines of the holder 2. Because of this, a mechanical overloading of the holder 2 and/or of the housing 9 as well as a penetration of the holder 2 into the housing 9 of the motor vehicle battery 1 can be prevented, so that safety-relevant internal components of the motor vehicle battery 1 are not damaged and the rising demands on the accident safety of a motor vehicle battery can be satisfied.

In order to be able to technically achieve the functionality with a holder 2 described above, it is initially provided again making reference to FIGS. 3 and 4 that the holder 2, with respect to the motor vehicle battery 1 and/or its housing 9, forms a separate unit. The holder 2 has a bending portion marked with reference number 3, which for example materially joins a first holding portion 4 and a second holding portion 5, wherein it is arranged quasi sandwich-like between the two holding portions 4, 5, so that a contiguous one-piece holder 2 is present. Practically, the bending portion 3 is ductile and makes possible, upon a force introduction 6 exerted by the disruptive body 28 at the holding portions 4, 5 in a force direction 13 a bending 7 of at least one holding portion 4, 5 transversely to the force direction 13 about a bending axis 8 of the bending portion 3. Here it is practical when the bending axis 8 of the bending portion 3 is defined for example by an imaginary section line between the surfaces of the holding portions 4, 5 or by the main extension direction of the bending portion 3.

In FIGS. 3 and 4 it is noticeable, further, that the first holding portion 4 of these two holding portions 4, 5 is fixed on the side shell surface 12 of the housing 9 of the motor vehicle battery 1 and the second holding portion 5 of these two holding portions 4, 5 is fixed on the motor vehicle structural part 17 of the motor vehicle 15. Furthermore, it is readily noticeable at least in FIG. 3 that in the starting state 32 of the holder 2 the first holding portion 4 is oriented at approximately 90°, i.e. orthogonally relative to the second holding portion 5, while in FIGS. 3 and 4 it is noticeable, that in the bent-over state 33 of the holder 2 the first holding portion 4 is oriented at approximately 180° relative to the second holding portion 5, so that the two holding portions 4, 5 lie in the said plane 29 and touchingly against the side shell surface 12 of the housing 9.

Again making reference to FIGS. 3 and 4 it still needs to be explained that the first holding portion 4 comprises a fixing portion 10, which defines a flat equipping surface 11. Here, the first holding portion 4 is supported via the equipping surface 11 over the full surface area directly on the side shell surface 12 of the housing 9 of the motor vehicle battery 1 oriented orthogonally with respect to the travelling direction 16 of the motor vehicle 15 and fixed, for example welded or bonded. The second holding portion 5 has a further fixing portion 23 which comprises a fixing means 24 and defines a flat further equipping surface 25, wherein the second holding portion 5 is arranged and fixed on the motor vehicle structural part 17 via the further equipping surface 25 supported over the full surface area directly on a mounting surface 19 of the motor vehicle structural part 17 of the motor vehicle 15 and with the help of the fixing means 24.

The bending portion 3 and the two holding portions 4, 5, i.e. the entire holder 2, are exemplarily produced from a ductile monolithic material of identical material, so that in particular the bending portion 3 upon bending 7 of at least one holding portion 4, 5 about the bending axis 8 of the bending portion 3 does not fail through a brittle fracture.

Figure 5:
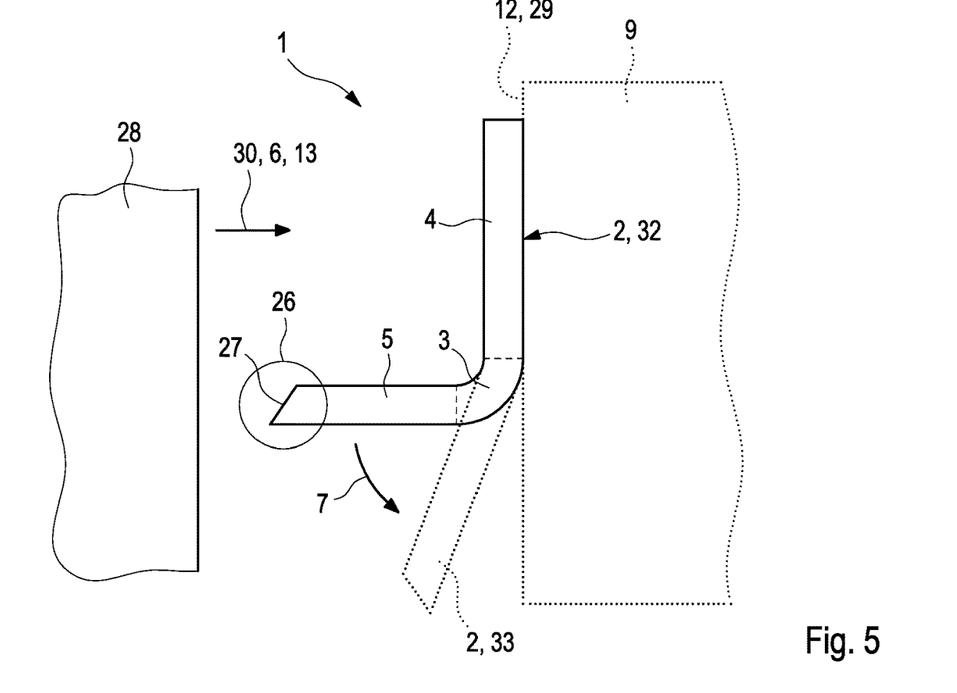

FIG. 5 shows in a lateral view an alternative embodiment of a motor vehicle battery 1 according to the invention, wherein the holder 2 there is presented in a starting state 32 and a bent-over state 33 indicated by dotted line. The second holding portion 5 of the holder 2 has, at a free front portion 26 that is distant from the bending portion 3 facing away with respect to the side shell surface 12 of the housing 9 of the motor vehicle 1, a chamfer 27 which, with respect to the illustrated force introduction 6 or the force direction 13 of the force introduction 6, is configured angularly tilted so that upon a force introduction 6 on the second holding portion 5 caused by the disruptive body 28, the second holding portion 5 can slide off over the sliding surface or the chamfer 27 on the disruptive body 28 in a predetermined direction and realise a desired bending 7 round about the bending portion 3.

Figure 6:
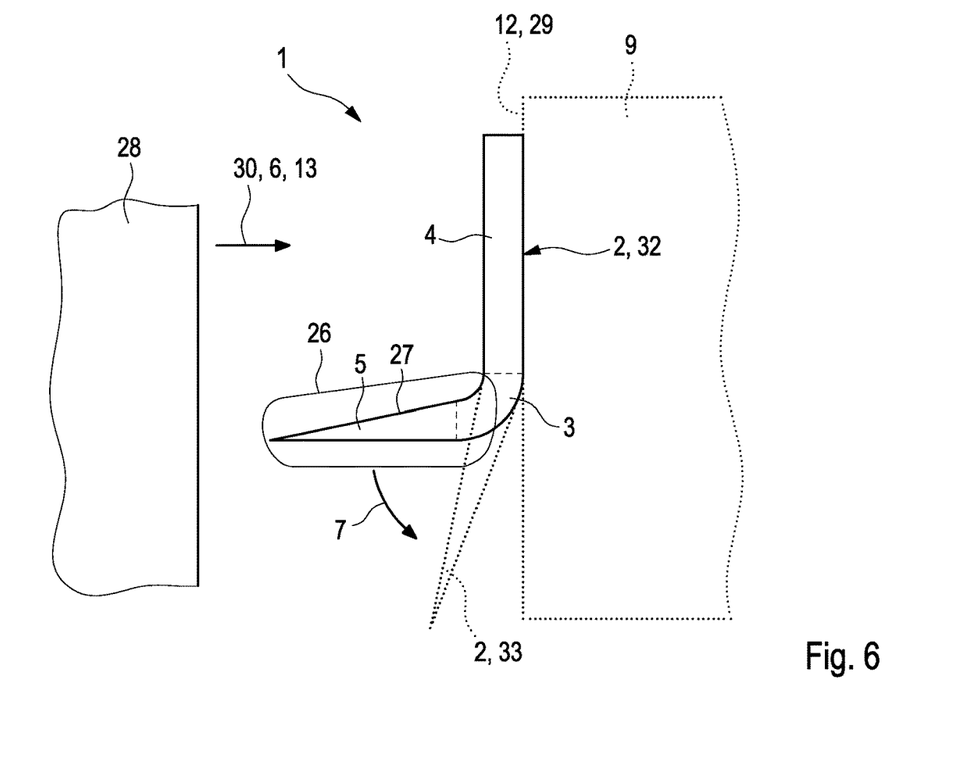

FIG. 6 shows in a lateral view an alternative further embodiment of a motor vehicle battery 1 according to the invention, wherein the holder 2 there is presented, as in FIG. 5, in a starting state 32 and in a bent-over state 33 indicated by dotted line. As in the preceding exemplary embodiment, the holder 2 or the holding portion 5 of the holder 2 has a chamfer 27 on a free front portion 26 that is distant from the bending portion 3 facing away with respect to the side shell surface 12 of the housing 9 of the motor vehicle battery 1. In contrast with the preceding exemplary embodiment, the present chamfer 27 however is realised by a wall thickness of the second holding portion 5 of the holder 2 decreasing from the housing 9 of the motor vehicle battery 1 towards the front portion 26. Thus, this holding portion 5 is thinner at its free end than at its housing-side root.

Figure 7:
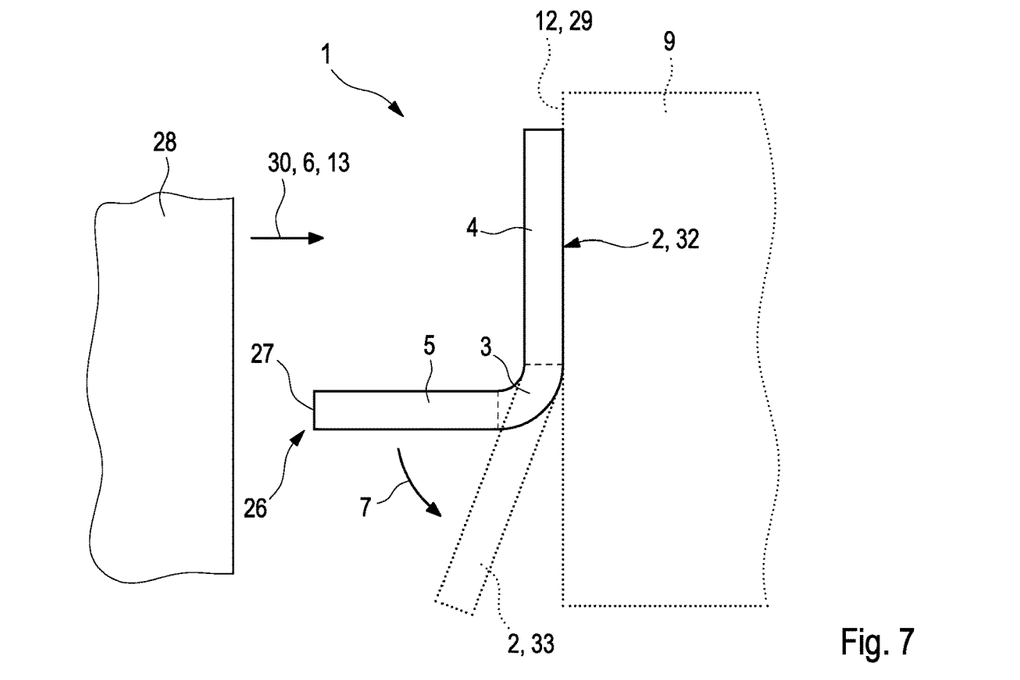

Furthermore, FIG. 7 shows in a lateral view an alternative further embodiment of a motor vehicle battery 1 according to the invention, wherein the holder 2 there is indicated in a starting state 32 and a bent-over state 33 indicated by dotted line. The holder 2 or the holding portion 5 of the holder 2 has a chamfer 27 at a free front portion 26 distant from the bending portion 3 facing away with respect to the housing 9 of the motor vehicle battery 1. In contrast with the preceding exemplary embodiments, this chamfer 27 however is oriented transversely with respect to the illustrated force introduction 6 or the force direction 13 of the force introduction 6.

Figure 8:
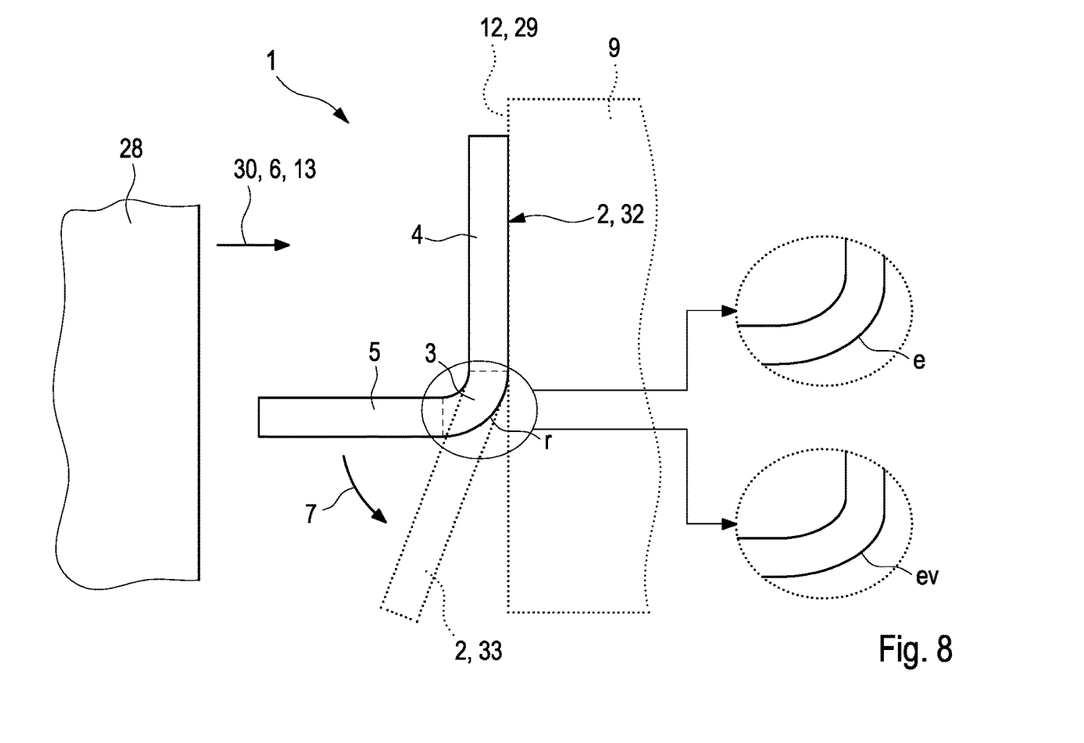

Finally, FIG. 8 shows in a lateral view the embodiment according to FIG. 7, however with the distinction that there a bending portion 3 of the holder 2 is shown with a radius r or in the form of an ellipse e, which is shown in FIG. 7 in an extract framed by a dotted line, or in the form of an involute ev, which in FIG. 7 is shown in a further extract framed by a dotted line, merges from the first holding portion 4 of the holder 2 into the second holding portion 5 of the holder 2 or vice versa.

The invention claimed is:
1. A motor vehicle battery for a motor vehicle, comprising:
a one-piece holder including a plurality of holding portions connected to one another via a bending portion of the holder,
wherein the bending portion upon a force introduction at the plurality of holding portions permits a bending of at least one of the plurality of holding portions relative to a bending axis of the bending portion,
wherein the plurality of holding portions includes a first holding portion and a second holding portion connected to one another via the bending portion,
wherein the bending portion of the holder merges with a radius or in the form of an ellipse or in the form of an involute from the first holding portion into the second holding portion.
2. The motor vehicle battery according to claim 1, wherein the bending portion is ductile.
3. The motor vehicle battery according to claim 1, wherein the bending portion and the plurality of holding portions are composed of an identical material.
4. The motor vehicle battery according to claim 1, wherein the holder is composed of a monolithic material.
5. The motor vehicle battery according to claim 1, wherein:
wherein the first holding portion of the two holding portions is fixed on a housing and the second holding portion of the two holding portions is fixable on a motor vehicle structural part or on a motor vehicle peripheral part.
6. The motor vehicle battery according to claim 5, wherein the first holding portion is oriented orthogonally with respect to the second holding portion.
7. The motor vehicle battery according to claim 5, wherein:
the first holding portion comprises a fixing portion that defines a flat equipping surface,
wherein the first holding portion is fixed on the housing via the equipping surface that is supported over the full surface area directly or indirectly on a side shell surface of the housing oriented orthogonally with respect to a travelling direction of the motor vehicle.

8. The motor vehicle battery according to claim 7, wherein:
the second holding portion comprises a further fixing portion, the further fixing portion including a fixing mechanism and defines a flat further equipping surface,
wherein the second holding portion is arranged on the motor vehicle structural part via the further equipping surface and with the help of the fixing mechanism supported over the full surface area directly or indirectly on a mounting surface of the motor vehicle structural part.

9. The motor vehicle battery according to claim 5, wherein at least the second holding portion includes a chamfer on a free front portion that is distant from the bending portion facing away with respect to the housing.

10. The motor vehicle battery according to claim 5, wherein the first holding portion and the second holding portion in a bent-over state lie in a common plane, wherein the first holding portion and the second holding portion each support one another on the housing.

11. A motor vehicle, comprising: a motor vehicle battery, the motor vehicle battery including:
a one-piece holder including a plurality of holding portions connected to one another via a bending portion of the holder;
wherein the bending portion upon a force introduction at the plurality of holding portions permits a bending of at least one of the plurality of holding portions relative to a bending axis of the bending portion;
wherein the plurality of holding portions includes a first holding portion and a second holding portion connected to one another via the bending portion,
wherein the bending portion of the holder merges with a radius or in the form of an ellipse or in the form of an involute from the first holding portion into the second holding portion; and
wherein the motor vehicle battery is installed in the motor vehicle and employed for feeding electrical consumers.

12. The motor vehicle according to claim 11, wherein the bending portion is composed of a ductile material.

13. The motor vehicle according to claim 12, wherein the bending portion and the plurality of holding portions are composed of an identical material.

14. The motor vehicle according to claim 11, wherein the holder is composed of a monolithic material.

15. The motor vehicle according to claim 11,
wherein the first holding portion is fixed on a housing of the motor vehicle battery and the second holding portion is fixable on a motor vehicle structural part or a motor vehicle peripheral part.

16. The motor vehicle according to claim 15, wherein the first holding portion is oriented orthogonally with respect to the second holding portion.

17. The motor vehicle according to claim 15, wherein at least the second holding portion includes a chamfer on a free front portion that is distant from the bending portion facing away with respect to the housing.

18. The motor vehicle according to claim 15, wherein the first holding portion and the second holding portion in a bent-over state lie in a common plane, wherein the first holding portion and the second holding portion each support one another on the housing.

19. A motor vehicle battery for a motor vehicle, comprising:
a one-piece holder including a plurality of holding portions connected to one another via a bending portion of the holder;
wherein the bending portion upon a force introduction at the plurality of holding portions permits a bending of at least one of the plurality of holding portions relative to a bending axis of the bending portion;
wherein the plurality of holding portions includes a first holding portion and a second holding portion connected to one another via the bending portion;
wherein the first holding portion is fixed on a housing and the second holding portion is fixable on a motor vehicle structural part or a motor vehicle peripheral part; and
wherein the first holding portion and the second holding portion in a bent-over state lie in a common plane, wherein the first holding portion and the second holding portion each support one another on the housing.

20. The motor vehicle battery according to claim 19, wherein at least the second holding portion includes a chamfer on a free front portion that is distant from the bending portion facing away with respect to the housing.

* * * * *